No. 831,414. PATENTED SEPT. 18, 1906.
W. E. CARLE.
SPARK AND CINDER TRAP.
APPLICATION FILED JAN. 31, 1906.
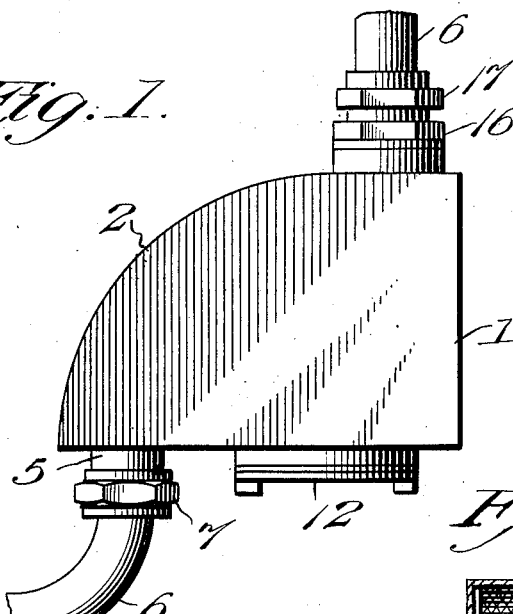
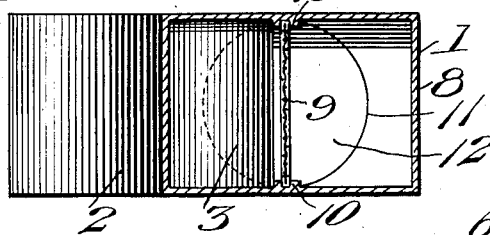
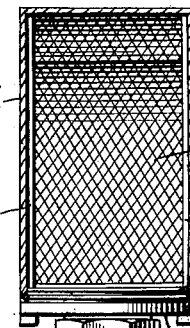
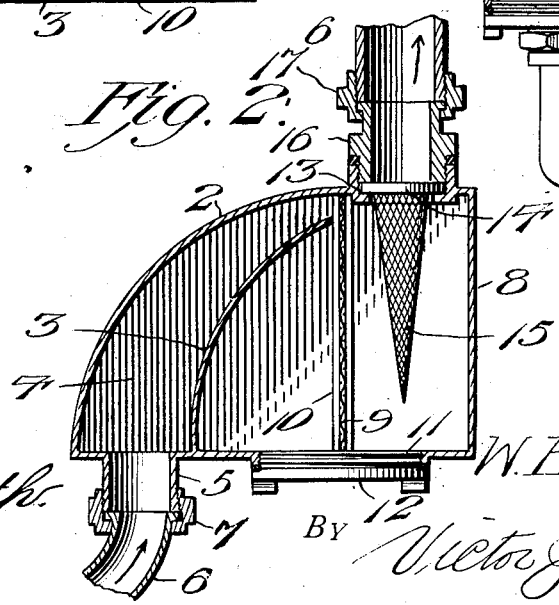
WITNESSES:
INVENTOR
W. E. Carle,
By Victor J. Evans
Attorney

UNITED STATES PATENT OFFICE.

WILLIAM E. CARLE, OF RICHMOND, VIRGINIA.

SPARK AND CINDER TRAP.

No. 831,414.  Specification of Letters Patent.  Patented Sept. 18, 1906.

Application filed January 31, 1906. Serial No. 298,853.

*To all whom it may concern:*

Be it known that I, WILLIAM E. CARLE, a citizen of the United States, residing at Richmond, in the county of Henrico and State of Virginia, have invented new and useful Improvements in Spark and Cinder Traps, of which the following is a specification.

This invention relates to spark and cinder traps, the object of the invention being to provide a simple and effective trap for catching sparks and cinders on trains, the trap being adapted to be interposed in the pipe connection between the water-supply tank or reservoir and the washbasins and other fixtures of a car which have to be supplied with water.

The primary object of the invention is to provide means for catching and arresting and disposing of the sparks and cinders before they reach the water-fixtures, so as to prevent the same from getting into the fixtures and grinding out the valves and valve-seats and rendering the fixtures leaky.

With the above and other objects in view the invention consists in the novel construction, combination, and arrangement of parts hereinafter more fully described, illustrated, and claimed.

In the accompanying drawings, Figure 1 is a side elevation of a trap embodying the present invention. Fig. 2 is a vertical longitudinal section through the same. Fig. 3 is a horizontal section through the trap, and Fig. 4 is a vertical section through the same.

The body of the trap is preferably in the form of a quadrant, as shown at 1, comprising one curved outer wall 2 and an inner curved wall or diaphragm 3, which converges toward the outer wall from bottom to top, as shown in Fig. 2. Communicating with the space or entrance-throat 4 between the walls 2 and 3 is a nipple extension 5, which is adapted to be connected to the water-supply pipe 6, leading from the tank or reservoir, by means of a coupling or union 7, the water being thus directed into the gradually-tapering and contracting throat 4 between the curved outer and inner walls 2 and 3, respectively.

The wall of the trap 1 opposite the curved wall 2 stands vertically, as shown at 8, and at a suitable distance therefrom within the body of the trap is arranged a vertically-disposed screen 9 of meshed-wire fabric, said screen being adapted to be slid upward and downward between suitable guides 10, projecting from the opposite inner surfaces of the side walls of the trap, as shown in Figs. 2, 3, and 4. This screen is removable through an outlet-opening 11 of the trap, said opening being circular, as shown in Fig. 3, and of a diameter equal to or slightly in excess of the width of the screen 9. The opening 11 is normally closed by means of a plug 12, preferably screwed into the opening 11. The plug 12 is removed to permit the accumulated cinders to be removed from the trap, and when said plug 12 is taken out the screen 9 may be slid downward and removed for cleaning the same.

In the top of the trap there is provided a rabbeted seat 13, in which is removably fitted the circumferential flange 14 of an inverted conical screen 15 of very fine mesh adapted to catch the finer particles or cinders which find their way through the coarser screen 9. Above the flange 14 is a removable nipple 16, which screws downward into the rabbeted seat 13 and clamps the conical screen 15 in place. The nipple 16 is provided with a coupling or union 17, by which it may be connected to another section of the water-supply pipe 6, as shown in Fig. 2, thus enabling the trap, as a whole, to be interposed within the water-supply pipe at any desired point between the supply-tank and the fixture or fixtures within the car.

The cinders which accumulate in the water-supply tank or reservoir (not shown) in passing through the water-supply pipe 6 are carried between the converging walls 2 and 3 and directed against the coarser screen 9, which arrests their onward progress and causes them to fall into the bottom of the trap. The finer cinders which pass through the screen 9 are caught and arrested by the conical screen 15 and are also deposited in the bottom of the trap. Periodically the plug 12 may be moved and the accumulated cinders taken out of the trap. The screen 9 may also be removed and cleaned, and by means of the construction described the finer sceren 15 is also made removable through the top of the trap by removing the nipple 16. The trap effectively prevents the cinders from reaching the valves of the water-fixtures in the car, and thereby prevents the grinding out of the valves and valve-seats, adding materially to the life of the fixtures.

I claim—

1. A trap embodying inlet and outlet openings, an upright screen interposed between said openings, convergent walls leading toward said screen, and a conical screen at the opposite side of the first-named screen from the deflecting-walls, said conical screen guarding the outlet of the trap.

2. A trap for the purpose described provided with an opening in the bottom thereof, a plug for closing said opening, a vertically-disposed screen extending from top to bottom of the trap and removable through said opening, converging and deflecting walls leading toward said screen, and an inverted conical screen located at the opposite side of the first-named screen and guarding the outlet of the trap.

3. A trap for the purpose described comprising inlet and outlet openings and provided with a cleaning-opening in the bottom thereof, a removable screen extending from top to bottom of the trap-body and removable through the cleaning-opening, converging walls leading from the inlet toward said screen, and a removable inverted conical screen of finer mesh guarding the outlet of the trap and made removable therefrom.

In testimony whereof I affix my signature in presence of two witnesses.

WILLIAM E. CARLE.

Witnesses:
THOMAS J. MARSALA,
EMMETT M. PEROE.